(12) United States Patent
Liu et al.

(10) Patent No.: US 10,397,569 B2
(45) Date of Patent: Aug. 27, 2019

(54) METHOD AND APPARATUS FOR TEMPLATE-BASED INTRA PREDICTION IN IMAGE AND VIDEO CODING

(71) Applicant: MEDIATEK INC., Hsin-Chu (TW)

(72) Inventors: Shan Liu, San Jose, CA (US); Jing Ye, San Jose, CA (US); Xiaozhong Xu, State College, PA (US); Tzu-Der Chuang, Zhubei (TW); Ching-Yeh Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 55 days.

(21) Appl. No.: 15/611,850

(22) Filed: Jun. 2, 2017

(65) Prior Publication Data
US 2017/0353719 A1    Dec. 7, 2017

Related U.S. Application Data

(60) Provisional application No. 62/365,403, filed on Jul. 22, 2016, provisional application No. 62/345,074, filed on Jun. 3, 2016.

(51) Int. Cl.
*H04N 19/00* (2014.01)
*H04N 19/11* (2014.01)
(Continued)

(52) U.S. Cl.
CPC ........... *H04N 19/11* (2014.11); *H04N 19/147* (2014.11); *H04N 19/156* (2014.11);
(Continued)

(58) Field of Classification Search
CPC .... H04N 19/11; H04N 19/156; H04N 19/176; H04N 19/463; H04N 19/82; H04N 19/147; H04N 19/593
See application file for complete search history.

(56) References Cited

U.S. PATENT DOCUMENTS

2011/0176614 A1* 7/2011 Sato ..................... H04N 19/105
375/240.16
2011/0261882 A1* 10/2011 Zheng ................. H04N 19/105
375/240.13
(Continued)

FOREIGN PATENT DOCUMENTS

| CN | 102308586 A | 1/2012 |
|---|---|---|
| CN | 103024382 A | 4/2013 |
| CN | 104363449 A | 2/2015 |

*Primary Examiner* — Zhihan Zhou
(74) *Attorney, Agent, or Firm* — McClure, Qualey & Rodack, LLP

(57) ABSTRACT

A method and apparatus for video coding using template-based Intra prediction are disclosed. According to one method, the template-based Intra prediction searches N template matching candidates to reduce the complexity. In another method, the template-based Intra prediction assigns different weights for different pixel locations of template or uses different pixel precision for interpolation filter during cost evaluation among template matching candidates. In yet another method, truncated template size is used to reduce the complexity. In yet another method, the left and top templates may have different sizes for non-square block. In yet another method, inverse templated-based Intra prediction is used.

5 Claims, 16 Drawing Sheets

(51) Int. Cl.
*H04N 19/156* (2014.01)
*H04N 19/176* (2014.01)
*H04N 19/593* (2014.01)
*H04N 19/82* (2014.01)
*H04N 19/147* (2014.01)
*H04N 19/463* (2014.01)

(52) U.S. Cl.
CPC ......... *H04N 19/176* (2014.11); *H04N 19/463* (2014.11); *H04N 19/593* (2014.11); *H04N 19/82* (2014.11)

(56) References Cited

U.S. PATENT DOCUMENTS

| | | | | |
|---|---|---|---|---|
| 2011/0286520 | A1* | 11/2011 | Xu | H04N 19/176 375/240.12 |
| 2012/0281752 | A1* | 11/2012 | Zheng | H04N 19/105 375/240.03 |
| 2012/0320976 | A1* | 12/2012 | Suzuki | H04N 19/61 375/240.12 |
| 2014/0139627 | A1* | 5/2014 | Chen | H04N 19/597 348/43 |

* cited by examiner

US 10,397,569 B2

METHOD AND APPARATUS FOR TEMPLATE-BASED INTRA PREDICTION IN IMAGE AND VIDEO CODING

CROSS REFERENCE TO RELATED APPLICATIONS

The present invention claims priority to U.S. Provisional Patent Application, Ser. No. 62/345,074, filed on Jun. 3, 2016 and U.S. Provisional Patent Application, Ser. No. 62/365,403, filed on Jul. 22, 2016. The U.S. Provisional Patent Applications are hereby incorporated by reference in their entireties.

FIELD OF THE INVENTION

The present invention relates to template-based Intra prediction (also known as decoder side intra mode derivation, DIMD) in video coding. In particular, the present invention discloses various techniques to reduce the complexity or improve the coding efficiency associated with template-based Intra prediction.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU (i.e., no splitting) or can be split into four smaller units of equal sizes (i.e., M/2×M/2 each), which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

Furthermore, according to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC. The partitions shown in the second row correspond to asymmetric partitions, where the two partitioned parts have different sizes.

The HEVC coding comprises Inter prediction and Intra prediction. For Intra prediction, the generation of Intra prediction includes three parts: Intra smoothing filter, Intra prediction, and Intra gradient filter. At first, a smoothing operation is applied to the reference samples as a pre-processing step before calculating the prediction. This smoothing operation corresponds to applying an FIR-filter with filter weights [1, 2, 1]>>2, with low-pass characteristics to the samples belonging to the left column and the above row of the current TU (transform unit). The Intra prediction of each TU is produced with the reconstructed samples of neighboring TUs. The samples involved in Intra smoothing are indicated in FIG. 1, where block 100 corresponds to the current block, line 110 corresponds to a horizontal boundary and line 120 corresponds to a vertical boundary. Whether this smoothing operation is used is determined by the TU size and the Intra prediction mode. Second, the Intra prediction of current block is derived from neighboring reference samples with a certain Intra prediction mode, and the Intra prediction mode is selected from DC mode, planar mode, and 33 directional modes by encoder and signaled in the bitstream. Third, if the Intra prediction mode is DC, horizontal or vertical mode, Intra gradient filter is further applied to the samples at the left and top boundaries of the current TU.

Out of all 35 Intra prediction modes in HEVC, three modes are considered as most probable modes (MPM) for predicting the Intra prediction mode in current prediction block. For example, the Intra prediction modes used in the left prediction block and in the above prediction block can be used as candidates of the MPM set. In the case that the Intra prediction modes in two neighboring blocks are identical and both directional, or only one of the two neighboring blocks is available and coded in Intra prediction and at the same time this Intra prediction mode is directional, two neighboring directions immediately next to this direction is also used in MPM. DC mode and Planar mode are also considered in MPM set to fill the available spot in the MPM, especially if the above or top neighboring blocks are not available or not coded in Intra prediction, or the Intra prediction modes in neighboring blocks are not directional. If the Intra prediction mode for current prediction block is one of the modes in the MPM set, 1 or 2 bins is used to signal which one it is. Otherwise, it is not the same as any entry in the MPM set, it will be coded as a non-MPM mode. There are all-together 32 such non-MPM modes and a (5-bit) fixed length coding method is applied to signal this mode. The 33 directions are illustrated in FIG. 2. In FIG. 2, there are all together 33 directional modes, i.e., H, H+1, . . . , H+8, H−1, . . . , H−7, V, V+1, . . . , V+8, V−1, . . . , V−8. This system can be expanded to a general case, where horizontal and vertical modes are represented as H and V modes. For other directional modes, they can be represented either as H+k or V+k modes, where k=±1, ±2, etc. For example, if 65 directional modes are used as shown in FIG. 3, k can be range from ±1 to ±16.

In some recent development beyond HEVC, additional 32 directional modes are used in between the existing 33 directional modes, as shown in FIG. 3. In this case, there are a total 65 modes including directional modes as well as some non-directional modes.

In HEVC, once a directional mode is decided, along the prediction direction, all the pixels in the current block will use the same predictor value. If the predictor falls in between two reconstructed reference sample, a bi-linear filter will be used to calculate the predictor as a weighted average of the two neighboring pixels. For example, the predictor signal P can be derived according to P=[P1*a+P2*(32−α)]/32, where P1 and P2 are the two neighboring reconstructed samples, integer a is the distance from the predictor P to P2 with a range between 0 and 32, inclusively.

The concept of Intra gradient filter is to utilize the gradient information along the Intra prediction direction to improve the quality of Intra prediction. For the Intra prediction modes from vertical/horizontal directions (v/h) to vertical/horizontal +8 directions (v+8/h+8) as shown in FIG. 2, the left column/the above row neighboring samples can locate their corresponding references along the Intra prediction direction from the above row/the left column. The gradient calculated with the neighboring samples can be used to improve the Intra prediction. An example for the vertical directional mode is illustrated in FIG. 4A, where $P_{ij}$ denotes the predictor at row i and column j. AL represents the reconstructed sample at the left-above corner of the current block, while $L_i$ represents the reconstructed sample in the left column of the current block. A new predictor is calculated as $$P'ij=Pij+\alpha\cdot(Li-AL), \quad (1)$$

where $\alpha$ is a fraction from 0 to 1 and is selected according to j, such as $\alpha=\frac{1}{2}$ for j=0, and $\alpha=\frac{1}{4}$ for j=1. $P'_{ij}$ is used as the final predictor. As for the horizontal directional mode, the final predictor $P'_{ij}$ is calculated as $$P'ij=Pij+\alpha\cdot(Aj-AL), \quad (2)$$

In the above equation, Aj is the reconstructed sample in the above row, which is shown in FIG. 4A. As for the directional modes v+1, . . . , v+8 and h+1, . . . , h+8, Li or Aj first obtains its corresponding reference sample RLi or RAj along the direction of Intra prediction. When RLi or RAj is not located at the position of integer pixel, they are produced by interpolation of integer pixels in the above row or the left column of the current block. The example of v+1, . . . , v+8 directional modes is shown in FIG. 4B. The final predictor P'ij is calculated as $$P'ij=Pij+\alpha\cdot(Li-RLi). \quad (3)$$

Similar to the vertical directional mode, $\alpha$ is a fraction from 0 to 1 and is selected according to the direction of Intra prediction and j. As for h+1, . . . , h+8 directional modes, the final predictor $P'_{ij}$ is calculated as $$P'ij=Pij+\alpha\cdot(Aj-RAj), \quad (4)$$

where $\alpha$ is a fraction from 0 to 1 and is selected according to the direction of Intra prediction and i.

The Intra gradient filter can be applied for all directional modes, i.e., v+1, . . . , v+8 and h+1, . . . , h+8 in HEVC. However, only when the Intra prediction mode is DC, horizontal or vertical mode, Intra gradient filter is used. If the Intra prediction is DC mode, the samples at the first row and first column are filtered by Intra gradient filter. If the Intra prediction is horizontal mode, then the samples at the first row are filtered by Intra gradient filter. If the Intra prediction is vertical mode, then the samples at the first column are further filtered by Intra gradient filter.

Besides Intra gradient filtering, another method called bi-directional Intra prediction is also proposed to improve the quality of Intra prediction in JCT-VC meetings. For diagonal Intra prediction modes, i.e. v+1, . . . , v+8 and h+1, . . . , h+8, a weighted sum of the reconstructed samples of the above row and the reconstructed samples from the left column along the direction is used as the Intra predictor. For example, for v+1, . . . , v+8 directional modes, as illustrated in FIG. 5, Pij from the neighboring samples of above row has a corresponding reference sample Fij in the left column along the prediction direction. If Fij is not located at the integer pixel position, it can be generated by interpolating integer pixels in the left column. The final predictor $P'_{ij}$ is then calculated as the weighted sum of Pij and Fij as $$P'ij=\alpha\cdot Pij+(1-\alpha)\cdot Fij \quad (5)$$

where $\alpha$ is a fraction from 0 to 1 and is selected according to the direction of Intra prediction together with j (for v+1, . . . , v+8 directional modes) or i (for h+1, . . . , h+8 directional modes).

After generating Intra predictors, the prediction error is further processed by transform and quantization and encoded by entropy coding. For entropy coding, the quantized coefficients are divided into multiple 4×4 coefficient groups, first. The coding order of different coefficient groups and scan order of coefficients in one coefficient group is selected according to Intra prediction mode and transform size. If the transform size is smaller than or equal to 8×8, Intra-mode-dependent scan will be used for the coding order of different coefficient groups and scan order of coefficients in one coefficient group. Otherwise, diagonal scan is used for the coding order of different coefficient groups and scan order of coefficients in one coefficient group.

Also, it is possible to have weighted sum of several predictors to generate the final prediction signal for Intra prediction (namely multiple parameter Intra prediction or MPI). The final predictor $P_{MPI}[i, j]$ of position (i, j) is defined as follows:

$$P_{MPI}[i,j]=(\alpha P_{HEVC}[i,j]+\beta P_{MPI}[i-1,j]+\gamma P_{MPI}[i,j-1]+ \delta P_{MPI}[i-1,j-1]+4)>>3,$$

where outside of the block $P_{MPI}[i,j]$ is equal to reconstructed signal as shown in FIG. 6, $$P_{MPI}[i,j]=REC[i,j], \text{ if } i<0\|j<0.$$

FIG. 6 illustrates an example of multiple parameter Intra prediction (MPI) process, where an input block is processed by Arbitrary Directional Intra (ADI) 610 followed by MPI 620. The strength of this post-processing (i.e., parameters $\alpha+\beta+\gamma+\delta=8$) is controlled on the CU level and signaled with up to 2 bits.

In an ITU-I contribution C1046 (A. Said, etc., "Position dependent Intra prediction combination," ITU-T SG16 COM 16-C1046-E, October 2015), a method is proposed to use a combination of filtered and unfiltered reference samples to form the final predictor p[x, y] as shown in FIG. 7 for unfiltered (710) and filtered (720) cases.

Signals r and s are used to represent the sequences with filtered and unfiltered references. The new prediction p [x, y] combines weighted values of boundary elements r[ ] with q[x, y] (i.e., predictor derived from filtered samples s[ ]) as following:

$$p[x,y]=\{(c_1^{(v)}>>\lfloor y/d\rfloor)r[x,-1]-(c_2^{(v)}>>\lfloor y/d\rfloor)r[-1,-1]+(c_1^{(h)}>>\lfloor x/d\rfloor)r[-1,y]-(c_2^{(h)}>>\lfloor x/d\rfloor)r[-1,-1]+b[x,y]q[x,y]+64\}>>7$$

where $c_1^v$, $c_2^v$, $c_1^h$, $c_2^h$ are stored prediction parameters, d=1 for block sizes up to 16×16, and d=2 for larger blocks, and $$b[x,y]=128-(c_1^{(v)}>>\lfloor y/d\rfloor)+(c_2^{(v)}>>\lfloor y/d\rfloor)-(c_1^{(v)}>>\lfloor y/d\rfloor)+(c_2^{(h)}>>\lfloor y/d\rfloor),$$

is a normalization factor.

In the contribution JVET-C-0061 (X. Xiu, etc., "Decoder-side Intra mode derivation", JVET-C0061, May, 2016), interpolation for Intra prediction using the planar mode is disclosed. According to JVET-C-0061, the sample at bottom-right corner current prediction block is either signaled or estimated using linear average of corresponding left reference sample and above reference sample). Accordingly, samples in the right most column and bottom row are bi-linearly interpolated using the top/bottom-right sample combination and the left/bottom-right sample combination (810) as shown in FIG. 8. The remaining pixels in the prediction block are predicted using similar bi-linear interpolation (820), as is shown in FIG. 8.

Template Based Intra Prediction

In the contribution JVET-C-0061, a decoder side Intra prediction mode derivation method is proposed, where the neighboring reconstructed samples of the current block are used as a template. Reconstructed pixels in the template are compared with the predicted pixels in the same corresponding positions. The predicted pixels are generated using the reference pixels, which are the neighboring reconstructed pixels around the template. For each of the possible Intra prediction modes, the encoder and decoder try to generate predicted pixels in the similar way as in HEVC for the positions in the template. The distortion between the predicted pixels and the reconstructed pixels in the template are compared and the recorded. The Intra prediction mode with minimum distortion is selected as the derived Intra prediction mode. During the template matching search, the available Intra prediction mode is increased to 129 (from 67) and the interpolation filter for reference sample is increased to 1/64-pel (from 1/32-pel). FIG. 9 illustrates an example of decoder side Intra mode derivation (DIMD), where L is the width and height of the template for both the pixels on the top of current block and to the left of current block (i.e., the Target block shown in FIG. 9).

Quadtree Plus Binary Tree (QTBT) Structure

In contribution m37524/COM16-C966 (J. An, et al., "Block partitioning structure for next generation video coding," MPEG doc. m37524 and ITU-T SG16 Doc. COM16-C966, October 2015), a quadtree plus binary tree (QTBT) block partitioning structure is disclosed. According to QTBT, a coding tree block (CTB) is firstly partitioned by a quadtree structure. The quadtree leaf nodes are further partitioned by a binary tree structure. The binary tree leaf nodes, namely coding blocks (CBs), are used for prediction and transform without any further partitioning. For P and B slices, the luma and chroma CTBs in one coding tree unit (CTU) share the same QTBT structure. For I slice, the luma CTB is partitioned into CBs by a QTBT structure, and two chroma CTBs are partitioned into chroma CBs by another QTBT structure.

A CTU (or CTB for I slice), which is the root node of a quadtree, is firstly partitioned by a quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node, namely CU (or CB for I slice), will be used for prediction (e.g. Intra-picture or inter-picture prediction) and transform without any further partitioning. There are two splitting types in the binary tree splitting: symmetric horizontal splitting and symmetric vertical splitting.

Block partitioning 1010 and corresponding QTBT structure 1020 of FIG. 10 illustrates an example of block partitioning by using QTBT. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since it always splits a block horizontally and vertically into 4 sub-blocks of equal size.

In the above disclosure, JVET (joint video exploration team) refers to an international organization that has been established by both ITU-T VCEG and ISO/IEC MPEG to study the next generation video coding technologies. Reference software called JEM (joint exploration model) is built based on HEVC's reference software (HM). Some new video coding methods, including QTBT and 65 Intra prediction directions, are included in JEM software In order to reduce the complexity and/or increase the coding efficiency associated with DIMD, various techniques are disclosed.

BRIEF SUMMARY OF THE INVENTION

A method and apparatus for video coding using template-based Intra prediction are disclosed. According to one method, N template matching candidates are determined for the current block by selecting the N template matching candidates from a candidate group, wherein N is a positive integer. Costs associated with template matching Intra prediction are evaluated for said N template matching candidates to select one Intra mode from said N template matching candidates with a lowest cost as a final Intra mode. The current block is encoded or decoded using Intra prediction with a current Intra mode selected from an Intra mode group comprising the derived final Intra mode. The candidate group comprises one or more neighboring Intra modes from one or more neighboring blocks, one or more derived most probable modes (MPM), one or more selected Intra modes, one or more previous coded Intra mode, or a combination thereof. Said one or more selected Intra modes may comprise one or more Intra modes from a mode group consisting of DC, Planar, vertical more, horizontal mode, 45-degree diagonal mode and 135-degrees diagonal mode.

According to yet another method, a target Intra mode or an Intra-mode candidate set is determined using the template-based Intra prediction, where the template-based Intra prediction assigns different weights for different pixel locations of template or allows to use different filter precisions for interpolation filter during cost evaluation among template matching candidates. The current block is encoded or decoded using Intra prediction with a current Intra mode selected from an Intra mode group comprising the target Intra mode or the Intra-mode candidate set. In one embodiment, when different filter precisions are allowed for the interpolation filter, a same filter precision is used for all block sizes. In another embodiment, when different filter precisions are allowed for the interpolation filter, different filter precisions are used for Intra mode sets. In yet another embodiment, when different filter precisions are allowed for the interpolation filter, first filter precision used during template-based Intra prediction process for determining the target Intra mode or the Intra-mode candidate set is different from a second filter precision used for generating a final Intra predictor for the current block.

According to yet another method, if the template-based Intra prediction is selected for the current block, one or more size-reduced templates is determined by reducing a height of the left template to be less than a height of the current block, a width of the top template to be less than a width of the current block, or both. A target Intra mode or an Intra-mode candidate set is then determined using the template-based Intra prediction according to said one or more size-reduced templates. The current block is then encoded or decoded using Intra prediction using a current Intra mode selected from an Intra mode group comprising the target Intra mode or the Intra-mode candidate set. In one embodiment, the height of the left template is equal to a half of the height of the current block and the width of the top template is equal to a half of the width of the current block.

According to yet another method, the template-based Intra prediction uses a template region comprising a left template and a top template located on a left side and a top side of a target block respectively. If the template-based Intra prediction is selected for the current block and the current block is non-square, the template region having a first size of the left template to be different from a second size of the top template is selected. A target Intra mode or an Intra-mode candidate set is determined using the template-based Intra prediction according to the template region. The current block is encoded or decoded using Intra prediction with a current Intra mode selected from an Intra mode group comprising the target Intra mode or the Intra-mode candidate set. If the width of the current block is larger than the height of the current block, the height of the top template is larger than width of the left template. Also, if the height of the current block is larger than the width of the current block, the width of the left template is larger than the height of the top template. The template region includes an upper-left template to form an L-shaped template.

According to yet another embodiment, if the template-based Intra prediction is selected for the current block, neighboring reference reconstructed pixels comprising first reference reconstructed pixels adjacent to a top side and a left side of the current block are identified. A template region comprising reconstructed pixels located on a left side and a top side of the neighboring reference reconstructed pixels is determined. The current block is encoded or decoded using Intra prediction with a current Intra mode selected from an Intra mode group comprising a second target Intra mode or a second Intra-mode candidate set, where the second target Intra mode or the second Intra-mode candidate set points to an inverse direction from the first Intra mode or the first Intra-mode candidate set respectively. The neighboring reference reconstructed pixels may form an L-shaped pixel line.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the following methods, a template, i.e., a set of reconstructed pixels from neighboring pixels of the current block is defined. For each of the pixels in this template, reference pixels from the neighboring pixels of the template are used to generate the corresponding predicted pixels using one of the available Intra prediction modes (either angular or non-angular). A cost function is defined to compare the distortion between the reconstructed pixels in the template and the predicted pixels in the template for a given Intra prediction mode. The template matching search is referred as evaluating the cost function among different Intra prediction modes within a template matching candidate set.

A: Template Matching for Non-Square Prediction Block

Figure 11:
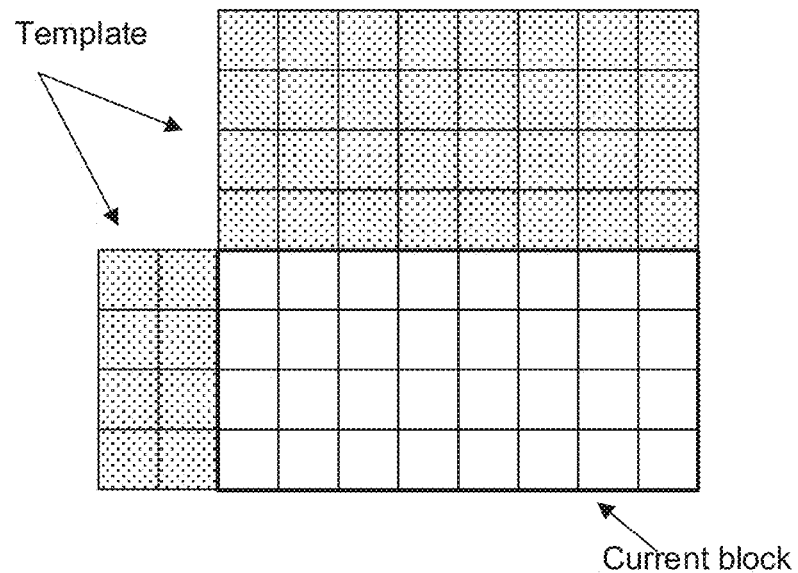
FIG. 11 illustrates an example of template for an 8×4 block, where the template is used for template-based Intra prediction.

When the current block is a non-square block, different sizes of the template can be designed for the current block. In one method, a larger value of L is assigned to the longer side of the current block. For example, for an 8×4 block, the template size to the left of current block is 2×4 and the template size on the top side of current block is 4×8, as illustrated in FIG. 11. In another method, a larger value of L is assigned to the shorter side of the current block.

Figure 12:
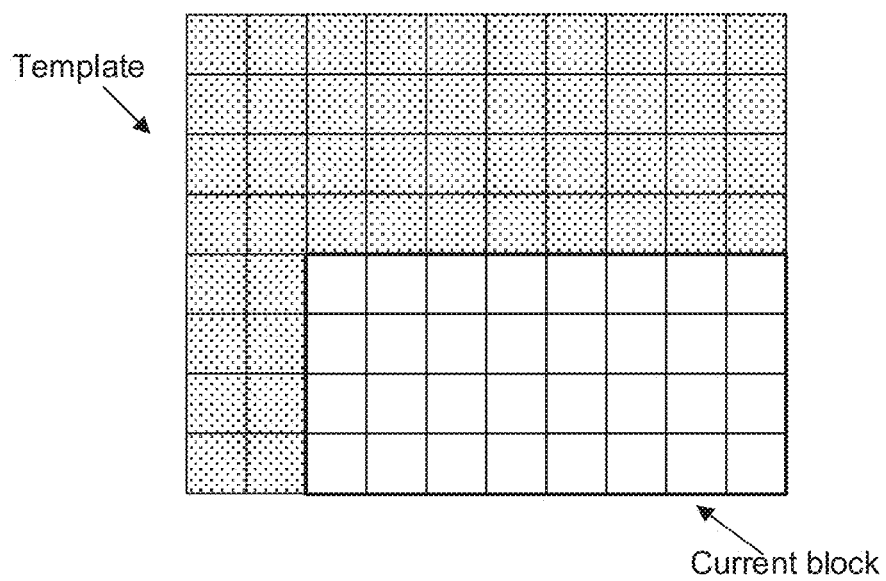
FIG. 12 illustrates an example of L-shaped template for an 8×4 block according to an embodiment of the present invention.

In one embodiment, the upper-left reconstructed pixels can be includes in the template. For example, as shown in FIG. 12, the L-shape region including the upper-left reconstructed pixels is used as the template.

Figure 13:
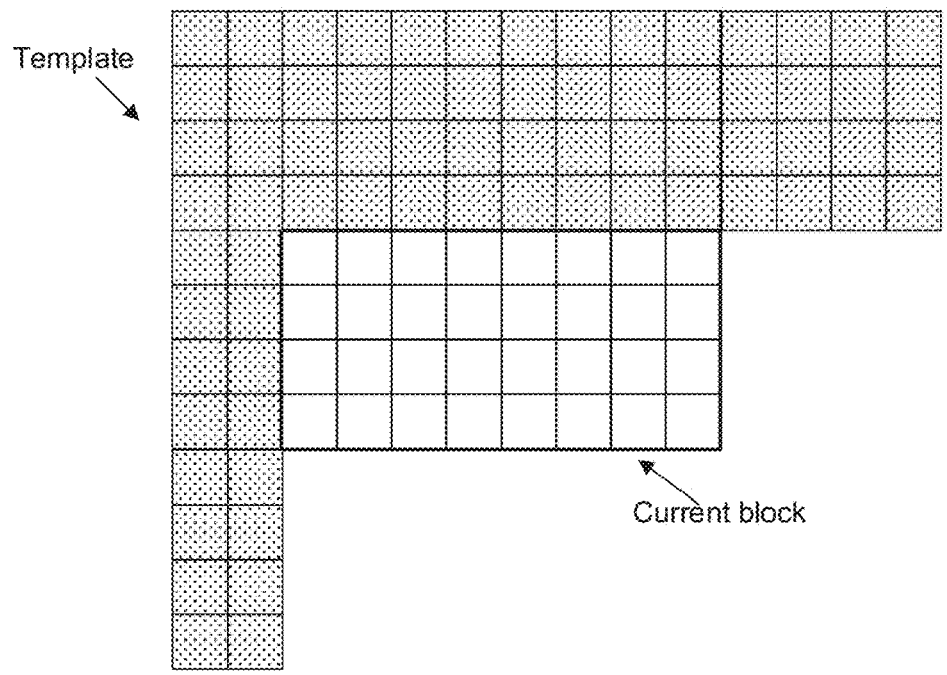
FIG. 13 illustrates an example of L-shaped template with extended areas for an 8×4 block according to an embodiment of the present invention.
Figure 14:
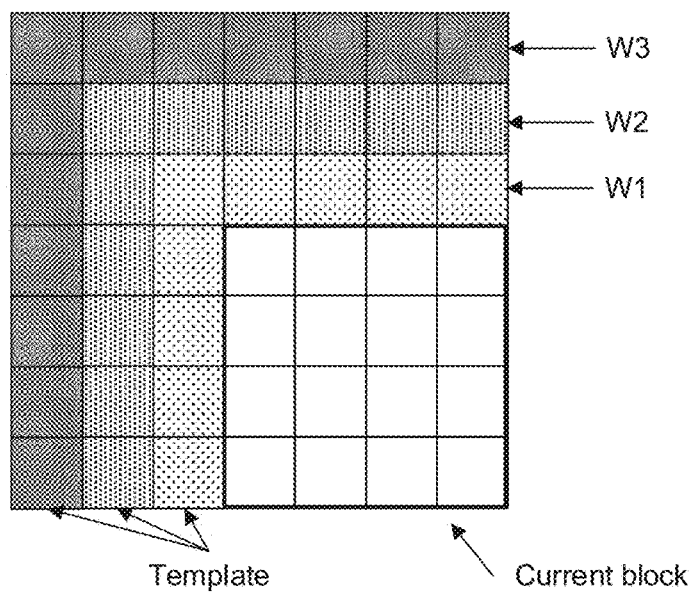
FIG. 14 illustrates an example of weighted distortion for template pixels at different template locations for cost evaluation according to an embodiment of the present invention.

In another embodiment, the upper-right and bottom-left reconstructed pixels can also be included in the template region as shown in FIG. 13.

B: Weight Assignment for Different Locations in a Template

Conventionally, the distortion between the reconstructed pixel and the predicted pixel in a template at each location has equal weight in the overall cost function. According to one method of the present invention, different weights are assigned to different locations in the template. The followings are a few variations to improve the template matching method.

In a first variation of this method, different weights can be assigned to the distortions depending on the distance of a pixel in the template to the current block in the calculation of the total cost function. For example, in FIG. 15, weight W1 is assigned to the column/row that is closest to the current block; W2 is assigned to the next row/column; W3 is assigned to the third row/column, etc. In particular, larger weights can be used for pixel locations in the template closer to the current block, such as W1=1, W2=½ and W3=¼.

In a second variation, different weights can be applied to different locations depending on the Intra prediction mode used to generate the predicted pixels in the template. In general, if the reference pixels to the left of the template have more impact on generating the predicted pixels, a larger weight is assigned to the pixels in the template that are to the left of the current block. If the reference pixels on the top of the template have more impact on generating the predicted pixels, a larger weight is assigned to the pixels in the template which are on top of the current block. For example, when horizontal-like (i.e., the angle closer to horizontal direction than to vertical direction) prediction modes are used, a larger weight is applied to pixels in the template that are to the left of current block. When vertical-like (i.e., the angle closer to the vertical direction than to the horizontal direction) prediction modes are used, a larger weight is applied to pixels in the template that are on the top of the current block. When non-angular prediction modes are used, equal weight can be applied to the pixels in the template according to one embodiment.

In a third variation, if the current block is a non-square block, different weights can be assigned to the two sides of template (i.e., the left and top sides of the current block). In one embodiment, a larger weight is assigned to template pixels in the longer side of the current block. For example, for an 8×4 block, for pixels in the template on the top of the current block, a weight W (larger than 1) can be assigned. In another embodiment, a larger weight is assigned to the shorter side of the current block.

In a fourth variation, the distortion consists of both the luma sample and chroma samples at each pixel location of the template. The weight assigned to luma sample can be different as compared to the weight to chroma samples. For example, for 4:2:0 color format, a 4×2 shaped template contains 4×2 luma (Y) samples and two 2×1 chroma (U and V) samples. The cost function for this template can be the sum of distortions of all the luma and chroma samples, i.e., Cost=Distortion (Luma)+Distortion (Chroma). The cost function can also be Cost=W*Distortion (Luma)+Distortion (Chroma), where W is a weight applied to luma distortions, W is not equal to 1.

C: Pixel Precision for Interpolation Filter Used in Template Matching

When the template matching is enabled for video data partitioned using the QTBT structures, different interpolation filter precision of Intra modes is used according to one method of the present invention. However, the present method may also be applied to the case using coding unit (CU) structure. The Intra modes may be based on those disclosed in JVET-C0061.

In a first variation of this method, when using Num1 (i.e., 35, 67, 131) Intra modes, all the block locations use 1/16-pel precision.

In a second variation, when using Num1 (i.e., 35, 67, 131) Intra modes, all the block locations use 1/32-pel precision.

In a third variation, when using Num1 (i.e., 35, 67, 131) Intra modes, all the block locations use 1/64-pel precision.

In a fourth variation, a combination with the invention disclosed in section D is disclosed, where different precisions for different numbers of Intra modes (e.g. different block sizes having different numbers of Intra modes) can be used. For those blocks using Num1 (i.e., 35) Intra modes, the corresponding interpolation filter precision can be 1/16-pel. For those blocks using Num2 (i.e., 67) Intra modes, the corresponding interpolation filter precision can be 1/32-pel. For those blocks using Num3 (i.e., 131) Intra modes, the corresponding interpolation filter precision can be 1/64-pel.

In a fifth variation, a combination with the invention disclosed in section D is disclosed, where different precisions for different numbers of Intra modes (e.g. different block size having different numbers of Intra modes). For those blocks using Num1 (i.e., 35) Intra modes, the corresponding interpolation filter precision can be 1/32-pel. For those blocks using Num2 (i.e., 67) Intra modes, the corresponding interpolation filter precision can be 1/64-pel. For those blocks using Num3 (i.e., 131) Intra modes, the corresponding interpolation filter precision can be 1/128-pel.

In a sixth variation, a combination with the invention disclosed in section D is disclosed, where different precisions for different numbers of Intra modes (e.g. different block size having different numbers of Intra modes). For those blocks using Num1 (i.e., 35) Intra modes, the corresponding interpolation filter precision can be 1/32-pel. For those blocks using Num2 (i.e., 67) Intra modes, the corresponding interpolation filter precision can be 1/32-pel. For those blocks using Num3 (i.e., 131) Intra modes, the corresponding interpolation filter precision can be 1/64-pel.

In a seventh variation, a combination with the invention disclosed in section D is disclosed, where different precisions for different numbers of Intra modes (e.g. different block size having different numbers of Intra modes). For all the blocks using template matching, the corresponding interpolation filter precision can be 1/16-pel. In another embodiment, for all the blocks using template matching, the corresponding interpolation filter precision can be 1/32-pel. For all the blocks using template matching, the corresponding interpolation filter precision can be 1/64-pel. For all the blocks using template matching, the corresponding interpolation filter precision can be 1/128-pel.

In an eighth variation, the interpolation filter precision and the interpolation filter to generate the final Intra prediction predictor for current block can be derived by the template matching. For example, when the Intra prediction mode is selected, different interpolation filter (e.g. bi-linear, bi-cubic, Lanczos resampling filter, Gaussian-filter, etc.) and/or different filter precision can be evaluated. The best filter or the best filter precision will be used to generate the predictor for the current block.

In a ninth variation, the smooth filter applied to the boundary reconstructed reference pixels can be derived by the template matching as well. For example, when the Intra prediction mode is selected, different smooth filter (e.g. bi-linear, [1, 2, 1]-filter, Gaussian-filter, [2, 3, 6, 3, 2] filter, etc.) can be evaluated. The best filter will be used to generate the predictor for the current block.

D: Selecting the Template Matching Candidate Modes for Complexity Reduction

In JVET-C0061, all Intra mode (i.e., the case of full search) or a set of 11 initial candidate modes (i.e., DC, Planar and every 4-th mode of the 33 HEVC angular Intra directions) are tested to find the derived Intra prediction mode. The tested modes are fixed and are independent of the neighboring blocks and coded modes. To reduce the complexity, it is propose to use Intra modes from a mode group, where the group comprises the Intra prediction mode of the neighboring blocks, derived MPMs and previous coded Intra prediction mode, or a combination of them to select N template matching candidate modes. The mode group includes N candidates, where N is an integer and N should be smaller or equal to the number of total available Intra prediction modes. The best template matching Intra prediction mode is derived from the N candidate modes.

Figure 15:
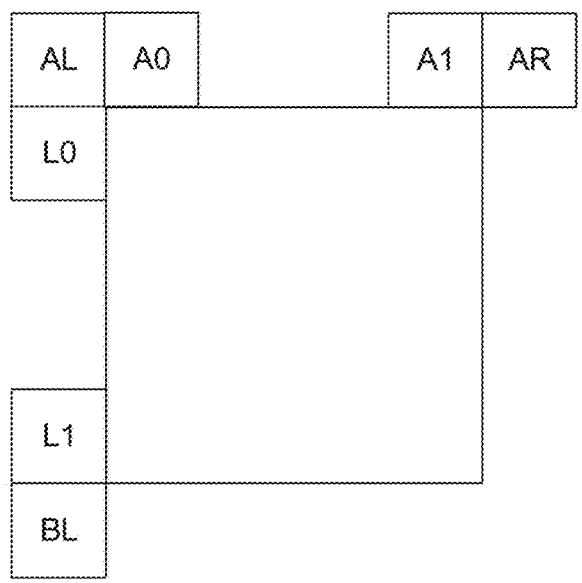
FIG. 15 illustrates an example of neighboring blocks that are used to derive Intra mode candidates for the template-based Intra prediction.

The N candidate modes can be derived from a set including MPMs, Intra modes of the neighboring blocks (e.g. the Intra modes of block AL, L0, L1, BL, A0, A1, and AR in FIG. 15), DC, Planar, vertical-more, horizontal mode, diagonal (i.e., 45 and 135 degrees) modes, latest K coded Intra prediction mode, and the closed modes of part of the modes above (e.g. L+1, L−1, L+2 and L−2 if block AL using angular mode L). The Intra modes that are not in the N candidate modes will not be tested. However, they can be explicated signaled by Intra prediction mode syntax if they are the best mode.

E: Inverse Prediction for Template Matching

Figure 1:
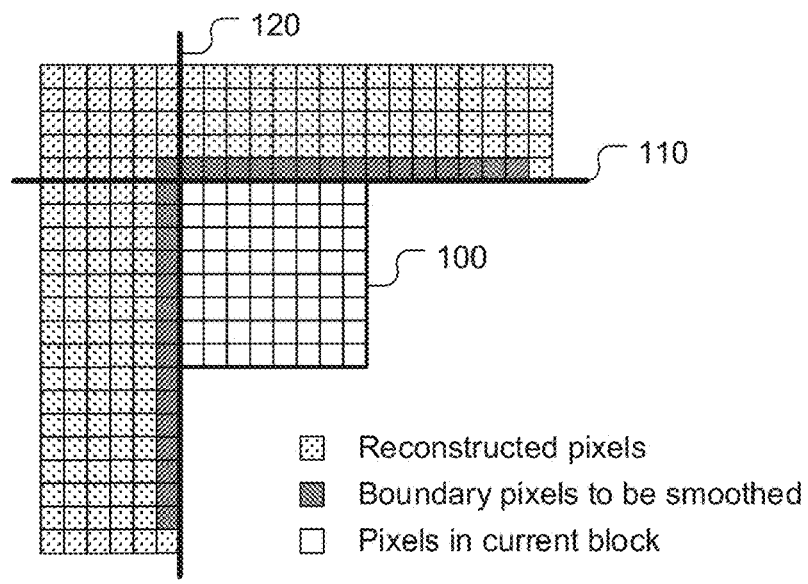
FIG. 1 illustrates the samples involved in Intra smoothing applied to a transform unit (TU) according to High Efficiency Video Coding (HEVC).
Figure 2:
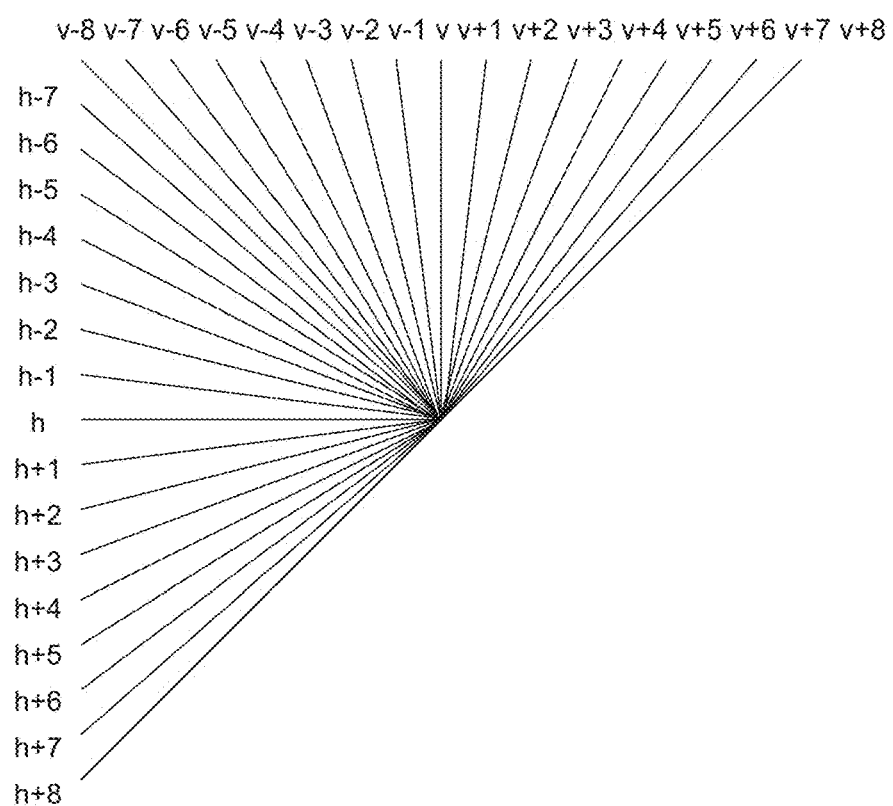
FIG. 2 illustrates the 33 directions for Intra prediction according to High Efficiency Video Coding (HEVC), where the directions are designated as H, H+1, . . . , H+8, H−1, . . . , H−7, V, V+1, . . . , V+8, V−1, . . . , V−8.
Figure 3:
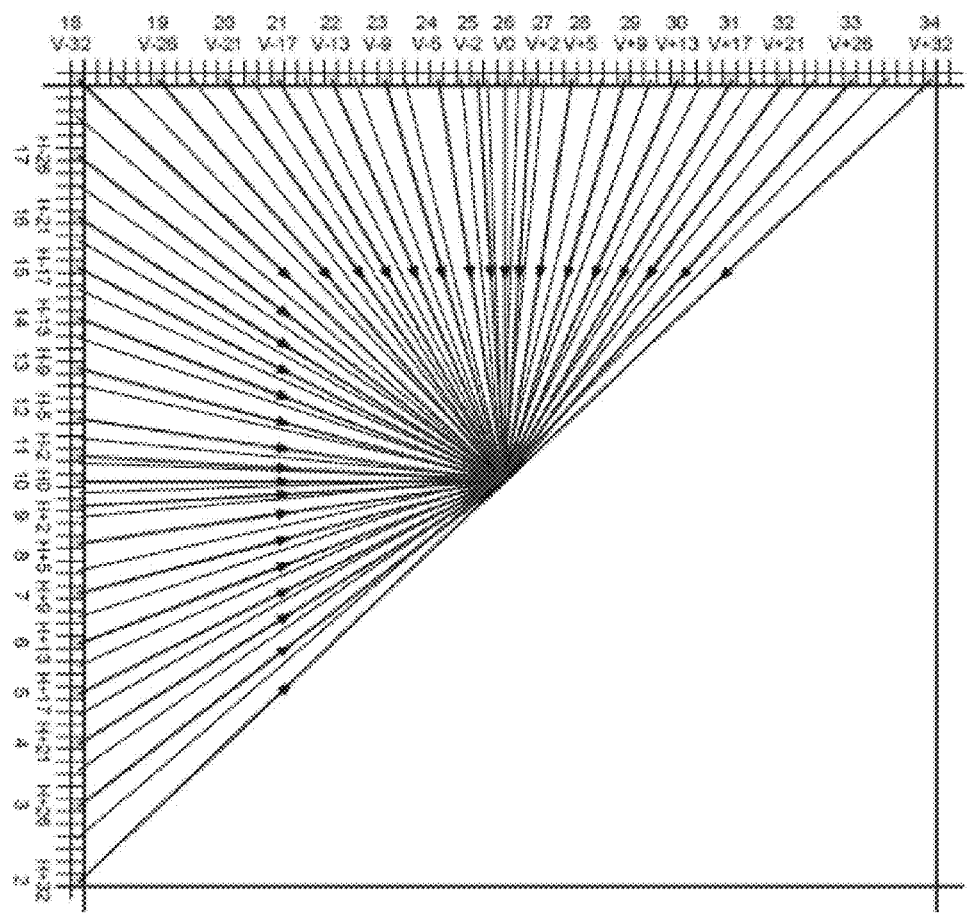
FIG. 3 illustrates an example of 65 directions for Intra prediction by adding 32 directional modes in between the existing 33 directional modes.
Figure 4A:
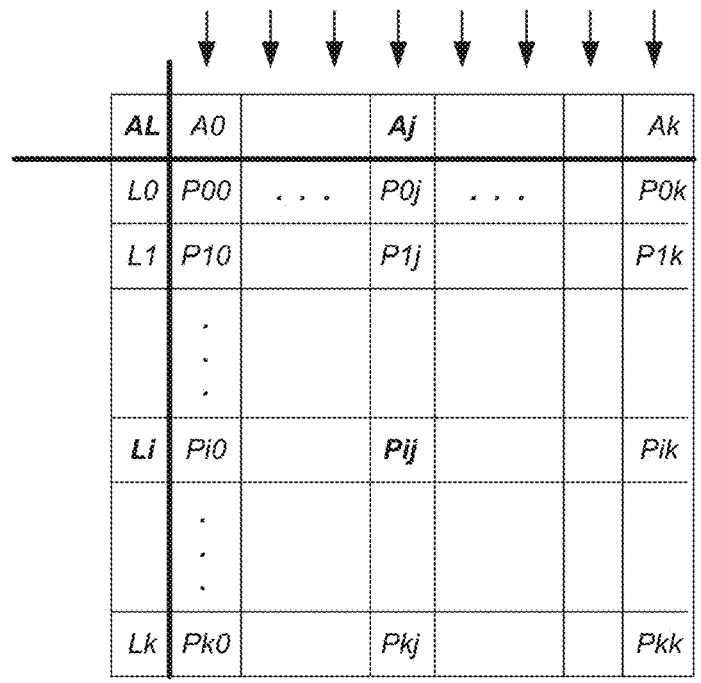
FIG. 4A illustrates an example for the vertical directional mode for Intra prediction.
Figure 4B:
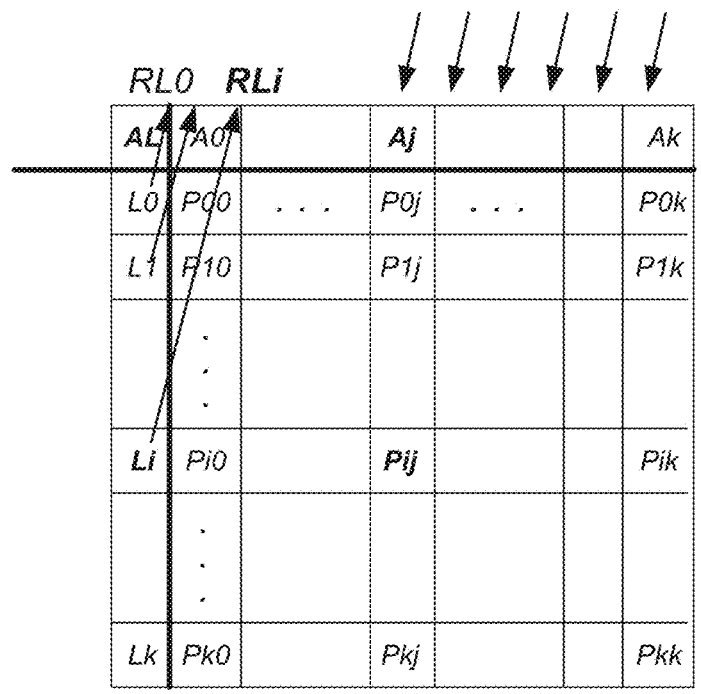
FIG. 4B illustrates an example Intra gradient filter for the Intra prediction modes from (v+1) to (v+8) according to High Efficiency Video Coding (HEVC).
Figure 5:
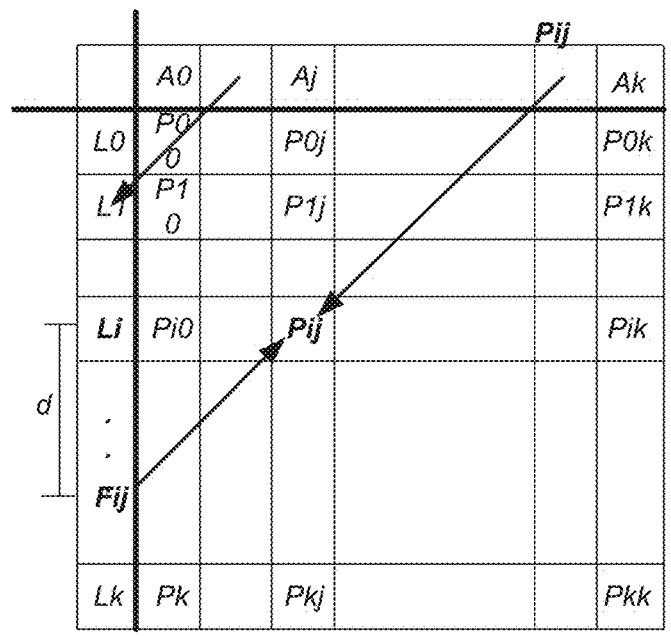
FIG. 5 illustrates an example bi-directional prediction filter for the Intra prediction modes from (v+1) to (v+8) according to High Efficiency Video Coding (HEVC).
Figure 6:
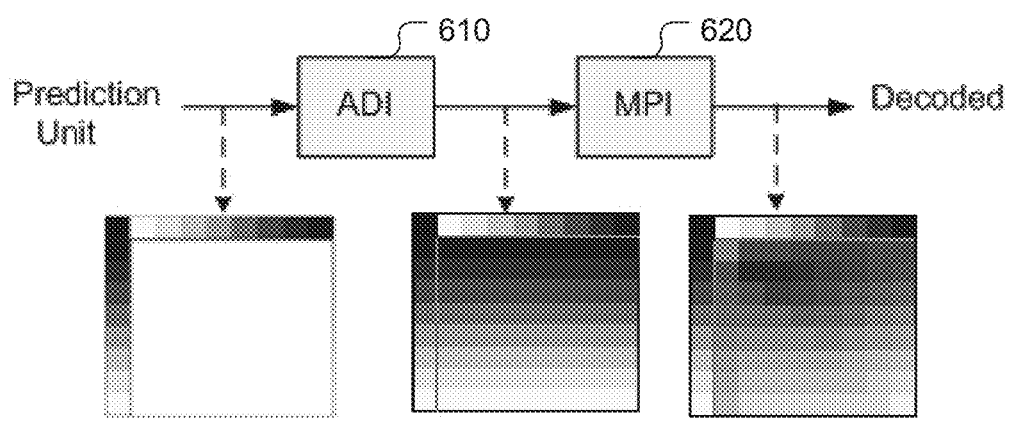
FIG. 6 illustrates an example of multiple parameter Intra prediction (MPI) process.
Figure 7:
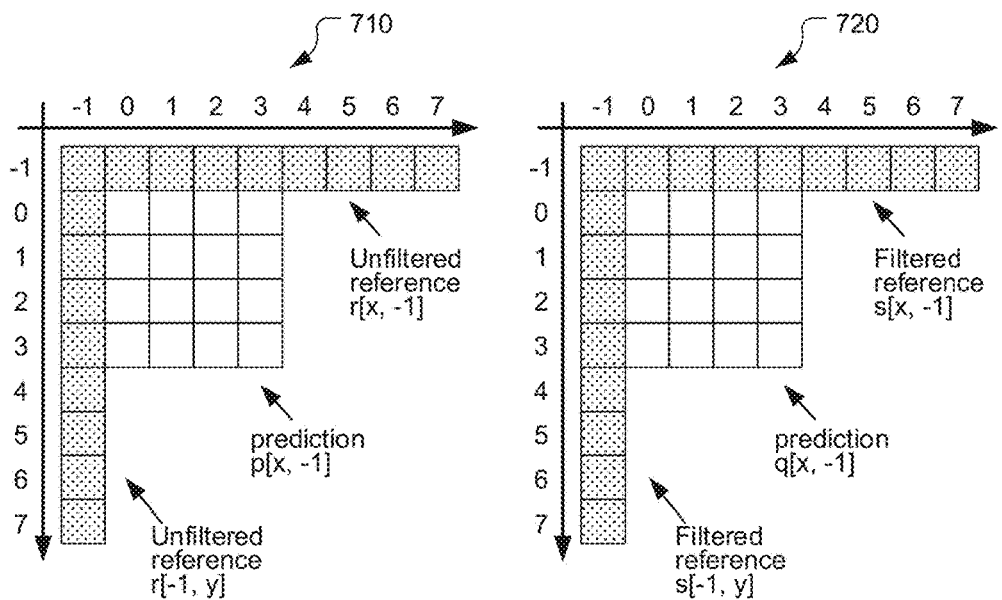
FIG. 7 illustrates an example of Intra prediction in 4×4 blocks for the unfiltered and filtered cases.
Figure 8:
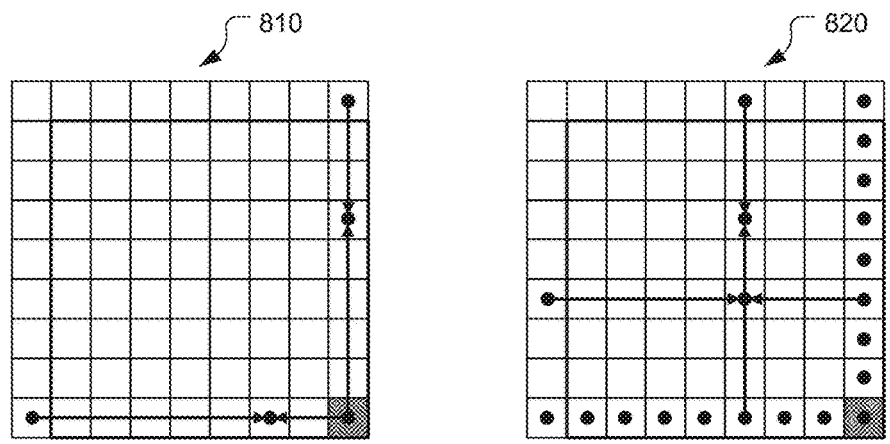
FIG. 8 illustrates an example of Bi-linear interpolation of right most column and bottom row (left) and Bi-linear interpolation of the rest samples (right).
Figure 9:
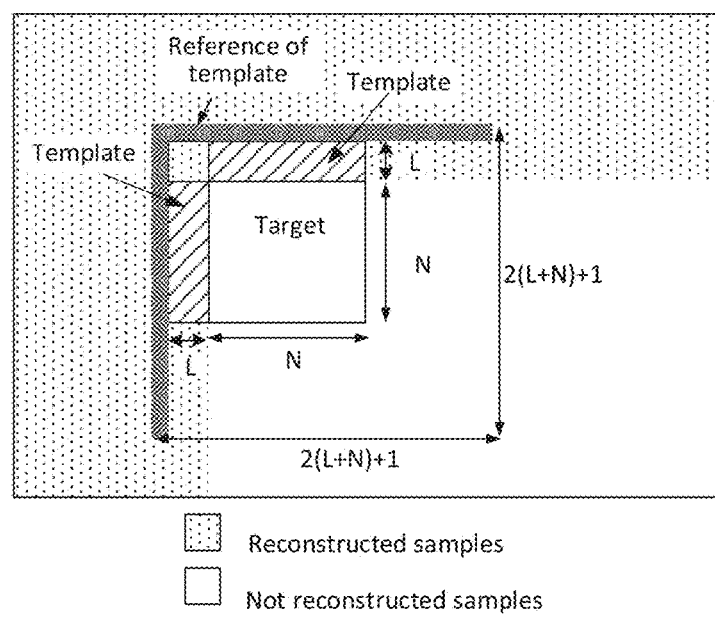
FIG. 9 illustrates an example of decoder side Intra mode derivation (DIMD), where the template correspond to pixels on the top of current block and to the left of current block.
Figure 10:
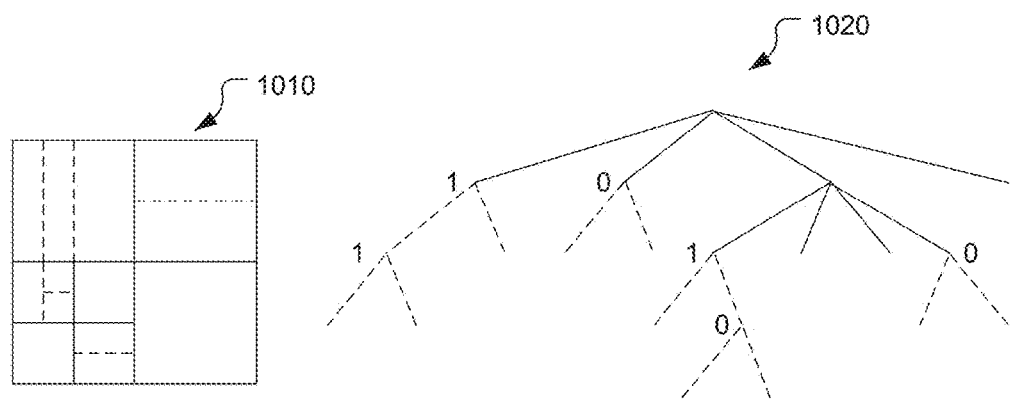
FIG. 10 illustrates an example of block partitioning by using QTBT, where the block partitioning is shown in the left and the corresponding QTBT structure is shown on the right.
Figure 16A:
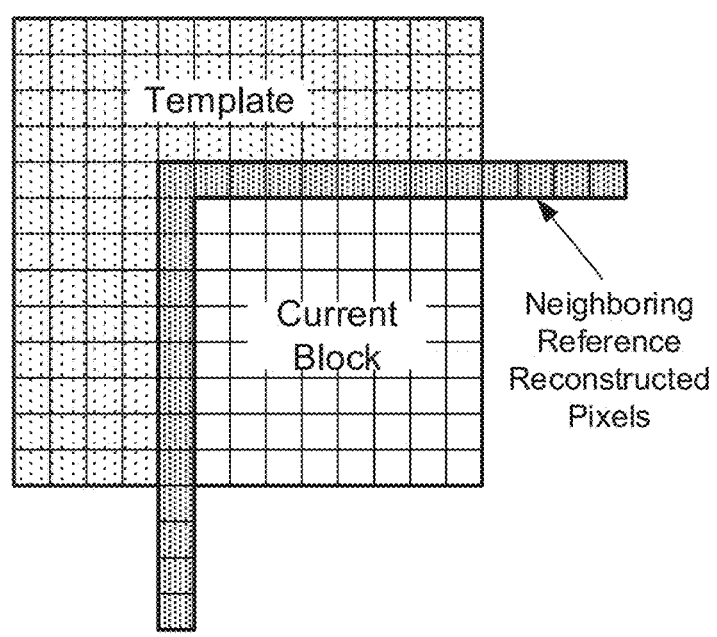
FIG. 16A-FIG. 16C illustrate three examples of selecting the template pixels and the neighboring reference reconstructed for inverse prediction of template matching.
Figure 16B:
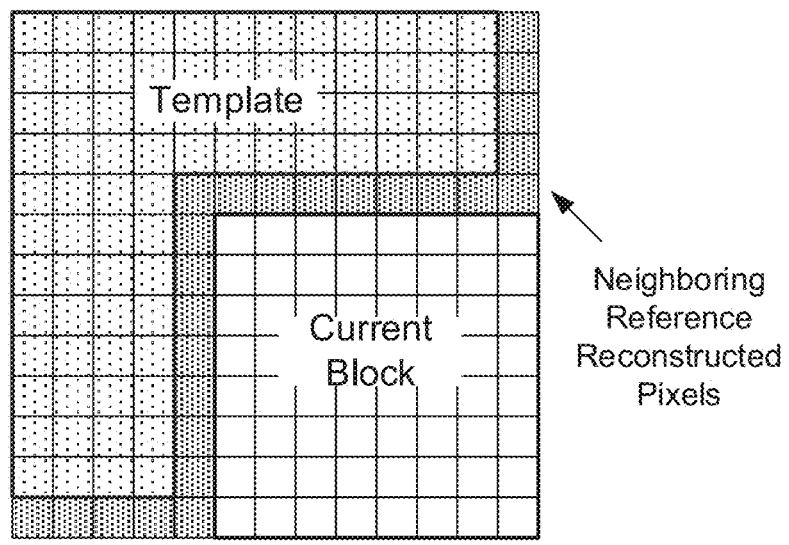
Figure 16C:
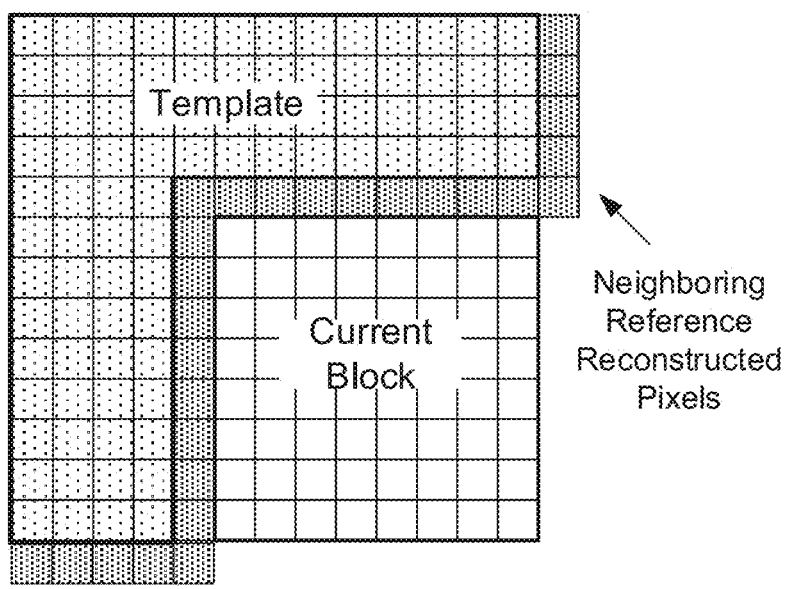
Figure 17:
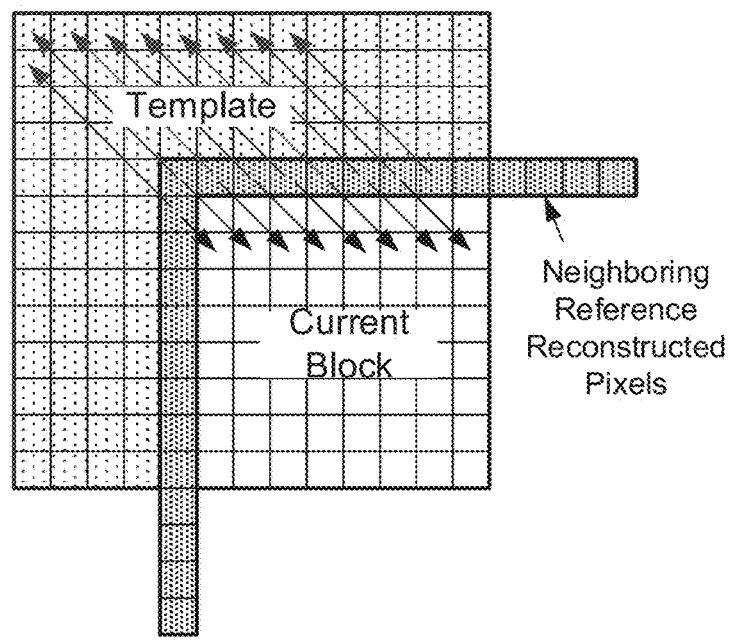
FIG. 17 illustrates an example of the inverse prediction for DIMD, where the 45-degree top-left to bottom-right Intra mode is evaluated and the generated predictors are used to predict the template in the inverse direction (e.g. the bottom-right to top-left).

In the template matching in JVET-C0061, the reference reconstructed pixels of template are left and above to the template as shown in FIG. 9. In the final Intra prediction, the neighboring reference reconstructed pixels of the current block are used to generate the Intra prediction predictors. It is propose to use the neighboring reference reconstructed pixels of the current block as the reference samples of template for the DIMD. The template pixels are the pixels above and left to the neighboring reference reconstructed pixels of the current block, as shown in FIGS. 16A-C. When performing DIMD, the inverse prediction is applied. For example, as shown in FIG. 17, if the 45-degree top-left to bottom-right Intra mode is evaluated, the generated predictors are used to predict the template in the inverse direction, such as the bottom-right to top-left. The proposed inverse prediction can be used to derive the Intra prediction mode, smooth filter, interpolation filter, and/or the precision of the interpolation filter.

In one embodiment, the difference (e.g. gradient values) between template and the neighboring reference reconstructed pixels of the current block can be used to propagate to the current block along the prediction direction as Intra prediction predictors.

In the following, additional methods associated with Intra prediction using template matching are disclosed. For convenience, Approach A refers to methods that use the best result from template matching search as the final Intra prediction mode and Approach B refers to methods that use the best result from template matching search as one candidate in the MPM.

F: Truncating the Template when Doing DIMD

In one embodiment, for the template size exceed maximum CU size, use the maximum CU size to derive the threshold.

Figure 18:
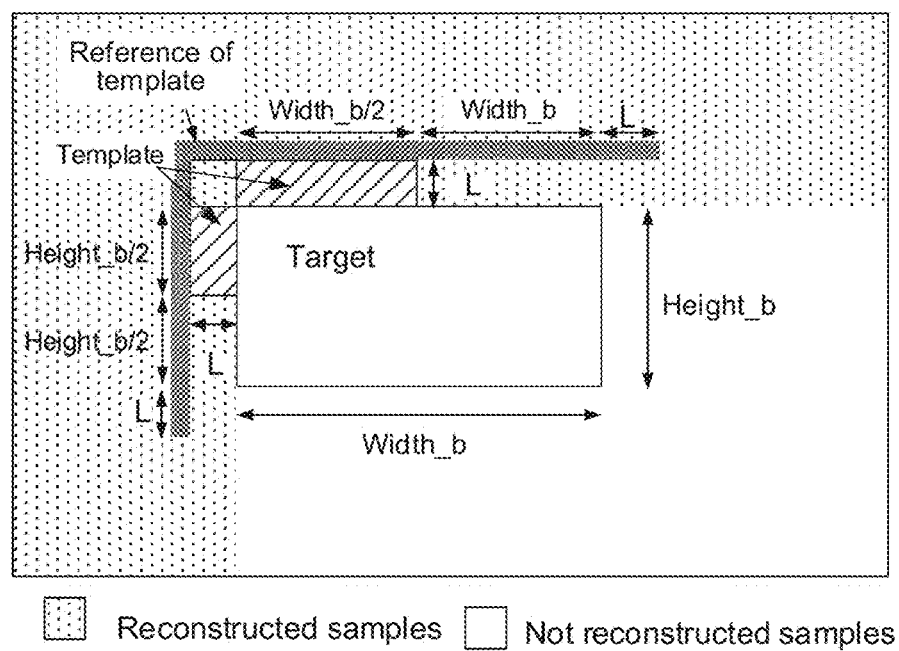
FIG. 18 illustrates an example of truncated template to reduce complexity according to an embodiment of the present invention.

In another embodiment, during performing DIMD (i.e., using template-based Intra prediction), all the block use width/2 and height/2 as the template length for the above and left of the current block, separately, as shown in FIG. 18.

In another embodiment, the template size can use ¾ width and ¾ height for template pixels length in the above and left of the current block separately. In another embodiment, the template length can use other value smaller than the width and height of current block.

The inventions disclosed above can be incorporated into various video encoding or decoding systems in various forms. For example, the inventions can be implemented using hardware-based approaches, such as dedicated integrated circuits (IC), field programmable logic array (FPGA), digital signal processor (DSP), central processing unit (CPU), etc. The inventions can also be implemented using software codes or firmware codes executable on a computer, laptop or mobile device such as smart phones. Furthermore, the software codes or firmware codes can be executable on a mixed-type platform such as a CPU with dedicated processors (e.g. video coding engine or co-processor).

Figure 19:
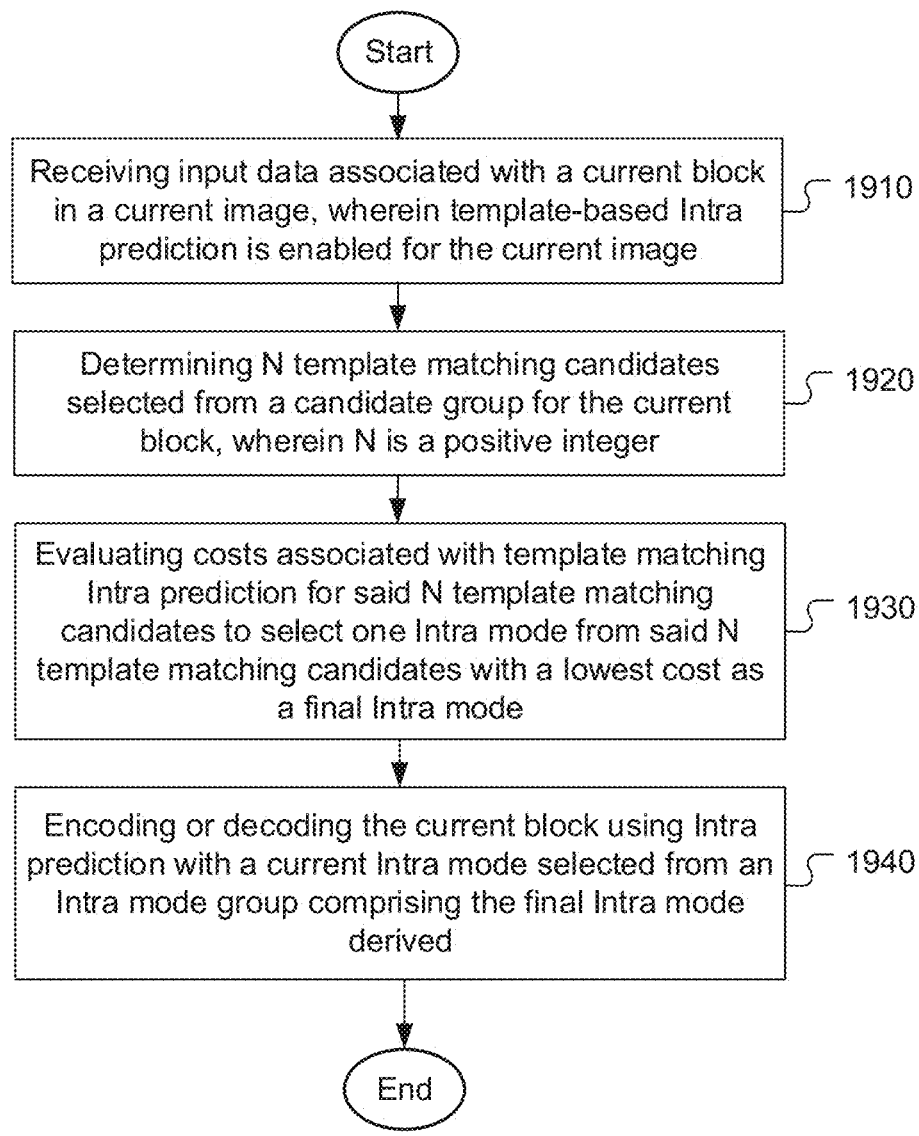
FIG. 19 illustrates a flowchart of an exemplary coding system with template-based Intra prediction enabled according to an embodiment of the present invention, where the template-based Intra prediction searches N template matching candidates to reduce the complexity.

FIG. 19 illustrates a flowchart of an exemplary coding system with template-based Intra prediction enabled according to an embodiment of the present invention, where the template-based Intra prediction searches N template matching candidates to reduce the complexity. According to this method, input data associated with a current block in a current image are received in step 1910, where template-based Intra prediction is enabled for the current image. N template matching candidates are determined for the current block by selecting from a candidate group in step 1920, and where N is a positive integer. Costs associated with template matching Intra prediction for the N template matching candidates are evaluated to select one Intra mode from the N template matching candidates with a lowest cost as a final Intra mode in step 1930. The current block is encoded or decoded using Intra prediction with a current Intra mode selected from an Intra mode group comprising the final Intra mode derived in step 1940.

Figure 20:
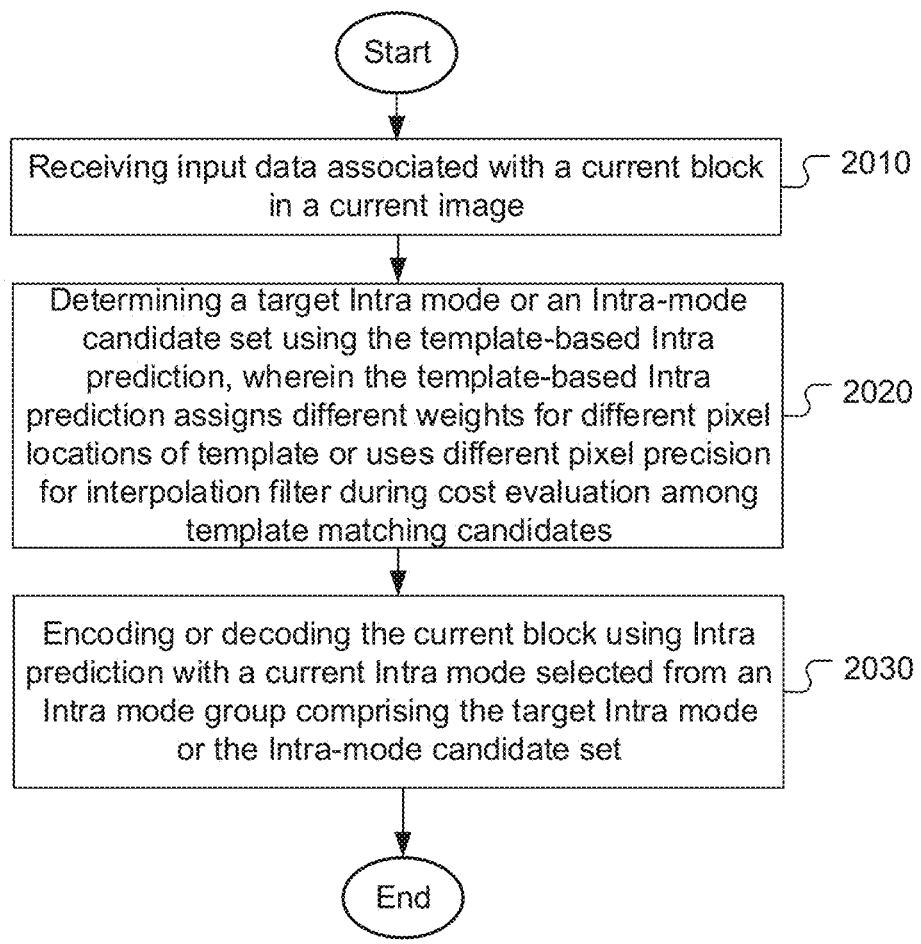
FIG. 20 illustrates a flowchart of an exemplary coding system with template-based Intra prediction enabled according to an embodiment of the present invention, where the template-based Intra prediction assigns different weights for different pixel locations of template or uses different pixel precision for interpolation filter during cost evaluation among template matching candidates.

FIG. 20 illustrates a flowchart of an exemplary coding system with template-based Intra prediction enabled according to an embodiment of the present invention, where the template-based Intra prediction assigns different weights for different pixel locations of template or uses different pixel precision for interpolation filter during cost evaluation among template matching candidates. According to this method, input data associated with a current block in a current image are received in step 2010. A target Intra mode or an Intra-mode candidate set is determined using the template-based Intra prediction in step 2020, where the template-based Intra prediction assigns different weights for different pixel locations of template or uses different pixel precision for interpolation filter during cost evaluation among template matching candidates. The current block is encoded or decoded using Intra prediction with a current Intra mode selected from an Intra mode group comprising the target Intra mode or the Intra-mode candidate set in step 2030.

Figure 21:
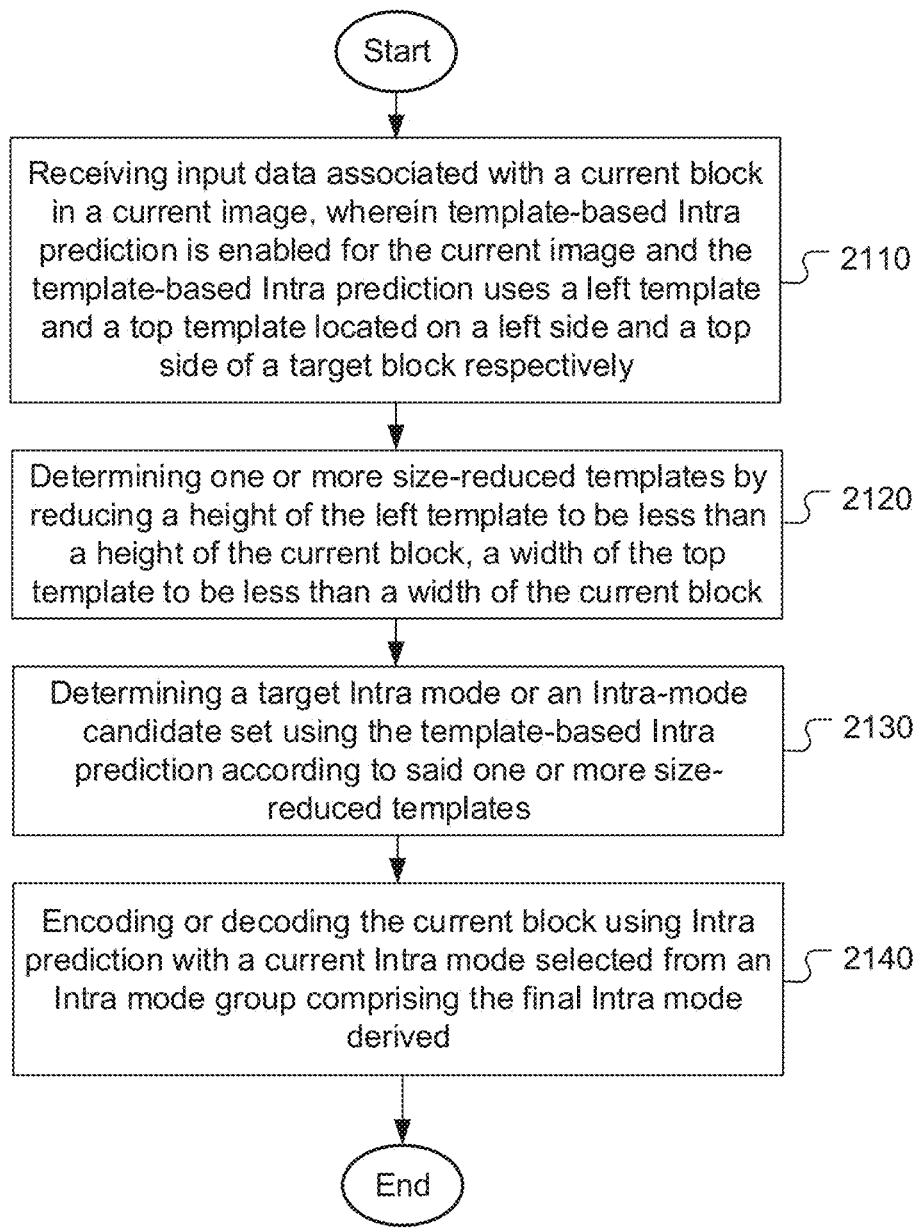
FIG. 21 illustrates a flowchart of an exemplary coding system with template-based Intra prediction enabled according to an embodiment of the present invention, where truncated template size is used to reduce the complexity.

FIG. 21 illustrates a flowchart of an exemplary coding system with template-based Intra prediction enabled according to an embodiment of the present invention, where truncated template size is used to reduce the complexity. According to this method, input data associated with a current block in a current image are received in step 2110, where template-based Intra prediction is enabled for the current image and the template-based Intra prediction uses a left template and a top template located on a left side and a top side of a target block respectively. One or more size-reduced templates are determined by reducing a height of the left template to be less than a height of the current block, a width of the top template to be less than a width of the current block, or both in step 2120. A target Intra mode or an Intra-mode candidate set is determined using the template-based Intra prediction according to said one or more size-reduced templates in step 2130. The current block is encoded or decoded using Intra prediction with a current Intra mode selected from an Intra mode group comprising the target Intra mode or the Intra-mode candidate set in step 2140.

Figure 22:
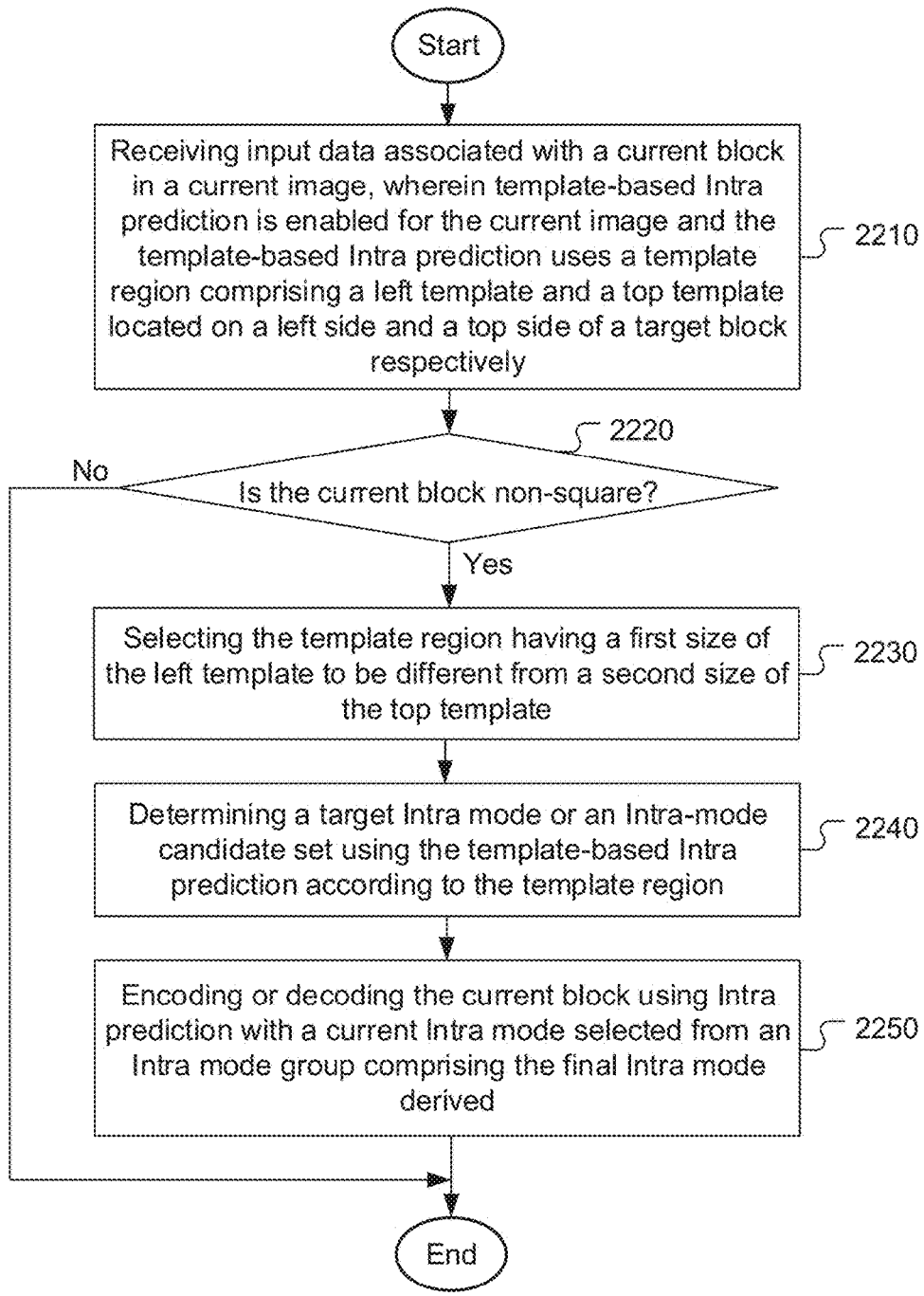
FIG. 22 illustrates a flowchart of an exemplary coding system with template-based Intra prediction enabled according to an embodiment of the present invention, where the left and top templates may have different sizes for non-square block.

FIG. 22 illustrates a flowchart of an exemplary coding system with template-based Intra prediction enabled according to an embodiment of the present invention, where the left and top templates may have different sizes for non-square block. According to this method, input data associated with a current block in a current image are received in step 2210, where template-based Intra prediction is enabled for the current image and the template-based Intra prediction uses a template region comprising a left template and a top template located on a left side and a top side of a target block respectively. Whether the current block is non-square is checked in step 2220. If the result is "Yes", steps 2230 to step 2250 are performed. Otherwise (i.e., the "No" path), steps 2230 to 2250 are skipped. In step 2230, the template region having a first size of the left template to be different from a second size of the top template is selected. In step 2240, a target Intra mode or an Intra-mode candidate set is determined using the template-based Intra prediction according to the template region. In step 2250, the current block is encoded or decoded using Intra prediction with a current Intra mode selected from an Intra mode group comprising the target Intra mode or the Intra-mode candidate set.

Figure 23:
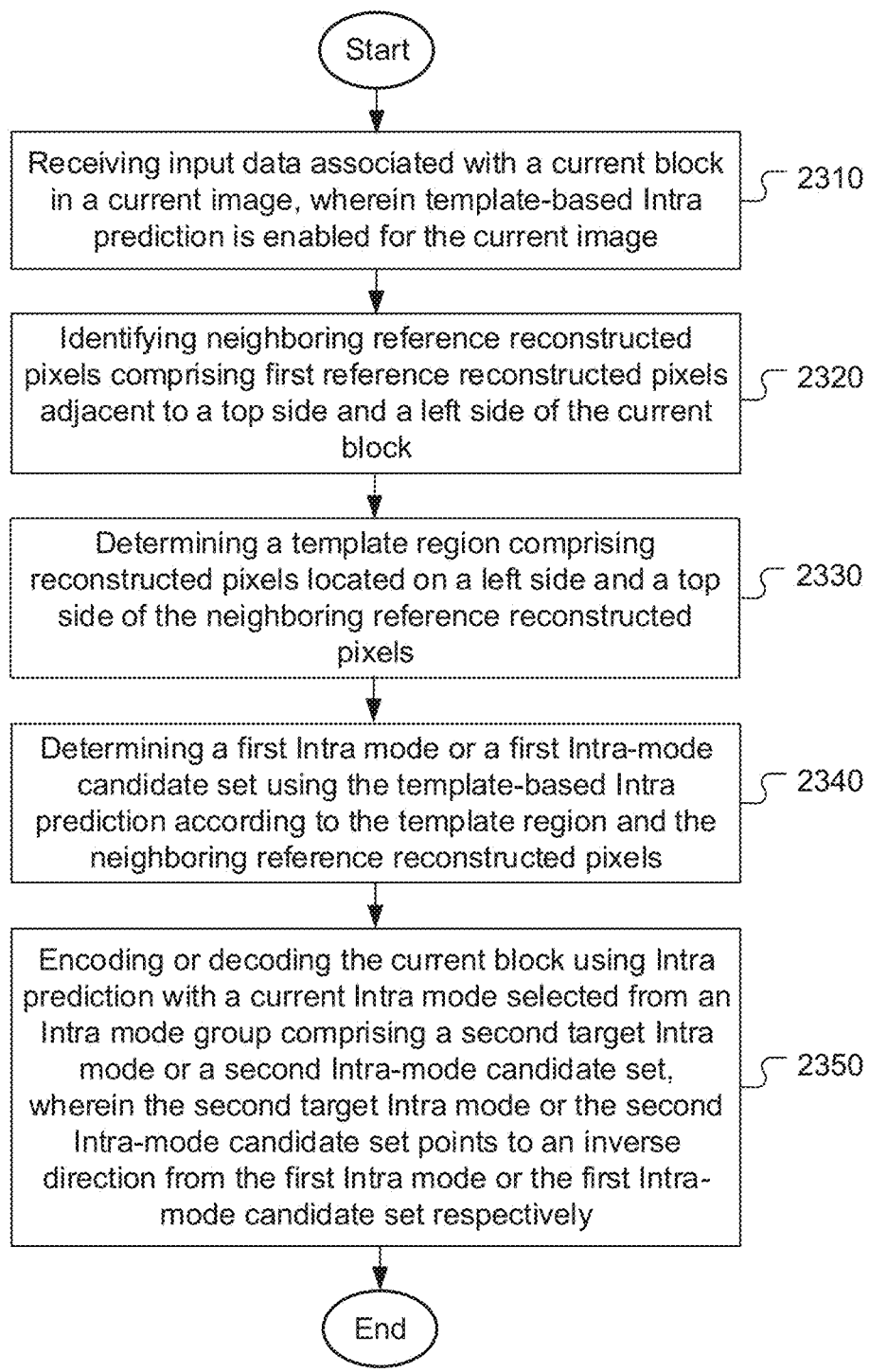
FIG. 23 illustrates a flowchart of an exemplary coding system with template-based Intra prediction enabled according to an embodiment of the present invention, where inverse templated-based Intra prediction is used.

FIG. 23 illustrates a flowchart of an exemplary coding system with template-based Intra prediction enabled according to an embodiment of the present invention, where inverse templated-based Intra prediction is used. According to this method, input data associated with a current block in a current image are received in step 2310, where template-based Intra prediction is enabled for the current image. Neighboring reference reconstructed pixels comprising first reference reconstructed pixels adjacent to a top side and a left side of the current block are identified in step 2320. A template region comprising reconstructed pixels located on a left side and a top side of the neighboring reference reconstructed pixels is determined in step 2330. A first Intra mode or a first Intra-mode candidate set using the template-based Intra prediction according to the template region and the neighboring reference reconstructed pixels in step 2340. In step 2350, the current block is encoded or decoded using Intra prediction with a current Intra mode selected from an Intra mode group comprising the target Intra mode or the Intra-mode candidate set.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding and decoding used by a video encoding system and video decoding system respectively, the method comprising:
receiving input data associated with a current block in a current image, wherein template-based Intra prediction is enabled for the current image;
receiving a plurality of neighboring reconstructed samples of the current block;
determining one or more size-reduced templates from said plurality of neighboring reconstructed samples, wherein determining the one or more size-reduced templates comprises at least one of:
identifying, from said plurality of neighboring reconstructed samples, a first set of neighboring reconstructed samples as a top template located on a top side of the current block with a template width less than a width of the current block; and
identifying, from said plurality of neighboring reconstructed samples, a second set of neighboring reconstructed samples as a left template located on a left side of the current block with a template height less than a height of the current block;
determining a target Intra mode or an Intra-mode candidate set using the template-based Intra prediction according to said one or more size-reduced templates, wherein determining the target Intra mode or the Intra-mode candidate set comprises:
generating prediction samples for said one or more size-reduced templates according to a corresponding available Intra mode; and
determining whether the corresponding available Intra mode is selected as the target Intra mode or one of the Intra-mode candidate set based on a comparison between the prediction samples and neighboring reconstructed samples in said one or more size-reduced templates; and
encoding or decoding the current block using Intra prediction with a current Intra mode selected from an Intra mode group comprising the target Intra mode or the Intra-mode candidate set.

2. The method of claim 1, wherein the template height of the left template is equal to a half of the height of the current block and the template width of the top template is equal to a half of the width of the current block.

3. The method of claim 1, wherein the template height of the left template is equal to ¾ of the height of the current block and the template width of the top template is equal to ¾ of the width of the current block.

4. The method of claim 1, wherein the template height of the left template is smaller than the height of the current block and the template width of the top template is smaller than the width of the current block.

5. An apparatus for video encoding and decoding used by a video encoding system and video decoding system respectively, the apparatus comprising one or more electronic circuits or processors arranged to:
receive input data associated with a current block in a current image, wherein template-based Intra prediction is enabled for the current image; and
receive a plurality of neighboring reconstructed samples of the current block;
if the template-based Intra prediction is selected for the current block:
determine one or more size-reduced templates from said plurality of neighboring reconstructed samples, wherein determining the one or more size-reduced templates comprises at least one of:
identifying, from said plurality of neighboring reconstructed samples, a first set of neighboring reconstructed samples as a top template located on a top side of the current block with a template width less than a width of the current block; and
identifying, from said plurality of neighboring reconstructed samples, a second set of neighboring reconstructed samples as a left template located on a left side of the current block with a template height less than a height of the current block;
determine a target Intra mode or an Intra-mode candidate set using the template-based Intra prediction according to said one or more size-reduced templates, wherein determining the target Intra mode or the Intra-mode candidate set comprises:
generating prediction samples for said one or more size-reduced templates according to a corresponding available Intra mode; and
determining whether the corresponding available Intra mode is selected as the target Intra mode or one of the Intra-mode candidate set based on a comparison between the prediction samples and neighboring reconstructed samples in said one or more size-reduced templates; and
encode or decode the current block using Intra prediction with a current Intra mode selected from an Intra mode group comprising the target Intra mode or the Intra-mode candidate set.

* * * * *